US010323146B2

(12) United States Patent
Faucon-Dumont et al.

(10) Patent No.: US 10,323,146 B2
(45) Date of Patent: Jun. 18, 2019

(54) LIGHTWEIGHT COATED MATERIALS AND USE ON ENGINEERING STRUCTURES

(71) Applicant: EUROVIA, Rueil Malmaison (FR)

(72) Inventors: Stéphane Faucon-Dumont, Martignas sur Jalles (FR); Ivan Drouadaine, Saint Medard en Jalles (FR); Sébastien Fer, Saint Medard en Jalles (FR)

(73) Assignee: EUROVIA, Rueil Malmaison (FR)

( * ) Notice: Subject to any disclaimer, the term of this patent is extended or adjusted under 35 U.S.C. 154(b) by 360 days.

(21) Appl. No.: 15/106,062

(22) PCT Filed: Dec. 19, 2014

(86) PCT No.: PCT/EP2014/078621
§ 371 (c)(1),
(2) Date: Jun. 17, 2016

(87) PCT Pub. No.: WO2015/091890
PCT Pub. Date: Jun. 25, 2015

(65) Prior Publication Data
US 2016/0326055 A1 Nov. 10, 2016

(30) Foreign Application Priority Data

Dec. 19, 2013 (FR) ...................................... 13 62958

(51) Int. Cl.
*C08L 95/00* (2006.01)
*C04B 26/26* (2006.01)
*C04B 14/10* (2006.01)
*C04B 14/22* (2006.01)
*C04B 111/00* (2006.01)
*C04B 111/40* (2006.01)

(52) U.S. Cl.
CPC .............. *C08L 95/00* (2013.01); *C04B 14/10* (2013.01); *C04B 14/22* (2013.01); *C04B 26/26* (2013.01); *C04B 2111/0075* (2013.01); *C04B 2111/00103* (2013.01); *C04B 2111/00482* (2013.01); *C04B 2111/40* (2013.01)

(58) Field of Classification Search
CPC ......... C08L 95/00; C09D 195/00; C10C 3/00; C04B 14/108; C04B 14/10; C04B 26/26; C04B 2111/40; C04B 2111/00103; C04B 2111/00482; C04B 2111/0075
See application file for complete search history.

(56) References Cited

U.S. PATENT DOCUMENTS

| 3,907,582 A * | 9/1975 | Walter ................... E01C 7/182 106/280 |
| 6,362,257 B1 * | 3/2002 | Chehovits ............... C08L 95/00 106/217.8 |
| 2011/0232529 A1 * | 9/2011 | Maze ...................... C08L 95/00 106/281.1 |

FOREIGN PATENT DOCUMENTS

WO    WO 2013/093046 A1    6/2013

OTHER PUBLICATIONS

ASTM Expanded Shale, Clay, and Slate Lightweight Aggregate. https://www.nrmca.org/sustainability/downloads/275.PCR_for_Expanded_Shale_Clay_and_Slate_Lightweight_Aggregate.pdf (Year: 2015).*
"Expanded Perlite". Accessed Dec. 13, 2018. https://www.perlipol.com.pl/en/expanded-perlite (Year: 2018).*
"Physical Properties of Structural Lightweight Aggregate" Chapter 3. Expanded Shale, Clay, & Slate Institute (ESCSI) Apr. 2007. (Year: 2007).*
International Search Report and the English translation of the Written Opinion of the International Searching Authority (Forms PCT/ISA/210 and PCT/ISA/237) dated May 15, 2015, for International Application No. PCT/EP2014/078621.
Anonymous, "On the Surface, Lightweight Aggregate Paves the Way to Safer, More Economical and Longer Lasting Roads," ESCSI Technical Docs, XP055138968, Jan. 1, 2008, 6 pgs.
French Preliminary Search Report dated Sep. 10, 2014, for French Application No. FR-1362958.
Hoff et al., "Light Weight Aggregate (LWA) Used in Road Pavements," XP055138969, Dec. 31, 2003, pp. 1-10.
Islam, "Evaluation of Lightweight Aggregates in Chip Seal," Thesis, XP-002729452 Dec. 31, 2010, pp. 1-88 (100 pgs total).

* cited by examiner

*Primary Examiner* — Alexandra M Moore
(74) *Attorney, Agent, or Firm* — Birch, Stewart, Kolasch & Birch, LLP

(57) ABSTRACT

The present invention relates to bituminous coated materials including a granular fraction and a binder, characterised in that in the granular fraction all or part of the elements are selected from among lightweight, non-absorbent aggregates with a density of less than 1.6 t/m³ and a water absorption coefficient of less than 15%. The invention also relates to the use of light, non-absorbent aggregates with a density of less than 1.6 t/m³ and a water absorption coefficient of 3% to 15% for the production of light bituminous coated materials. The invention further relates to pavements obtained by applying at least one layer of the coated materials according to the invention and to a method for applying a surface course to a surface raised above the ground which includes a step of applying coated materials according to the invention.

20 Claims, No Drawings

LIGHTWEIGHT COATED MATERIALS AND USE ON ENGINEERING STRUCTURES

The present invention relates to lightweight asphalt mix, intended for road application, particularly on engineering structures.

An asphalt mix is a mixture of aggregates (fines, sand and small gravel), binder and, optionally, doping agents or additives, applied in one or more layers for paving roads in particular. In an asphalt mix, the aggregates are completely covered, coated, in binder during manufacture. Asphalt mixes are applied by spreading and then compacted.

The aggregates are crushed and/or screened to then be mixed with the binder, such as bitumen, to make mixes. The aggregates are most often rock (sand to loose chippings) but they can also be derived from recycling or synthetic products. The mixture of aggregates and fines is also called the "aggregate fraction" in this description.

On the road, asphalt mix plays a key role for the safety and comfort of users. In addition to conventional asphalt mixes, there are asphalt mixes with specific characteristics. Draining asphalt, for example, absorb rainwater, preventing it from accumulating on the roadway. Acoustic asphalt mixes significantly reduce sound nuisances caused by road traffic (tyre road noise). "Anti-rutting" asphalt mixes optimize the preservation of roadway on routes that support intense heavyweight traffic.

The weight of asphalt mix is a limiting characteristic, however, when the pavement is applied onto an above-ground surface, such as engineering structures. To limit the weight of the pavement on above-ground surfaces, the thickness thereof is limited. For example, while, in practice, the intermediate asphalt mix course in road pavements applied on the ground has a thickness of 20 cm, the thickness of the intermediate asphalt mix course is reduced to 14 cm when the motorway passes over an engineering structure. This involves discontinuity in construction, which increases construction duration and cost, and entails additional costs during upkeep.

Therefore an asphalt mix is sought that is sufficiently strong and durable to be able to be applied on roads, particularly highways, and sufficiently light to be able to be applied on engineering structures at an identical thickness to the thickness used on the ground.

The use of porous clay, expanded rock, such as vermiculite, pozzolan, expanded shale, expanded mica, perlite or expanded glass to replace all or part of the aggregates has already been described, mainly in order to produce acoustic asphalt mixes. Since these expanded compounds are also less dense than aggregates, the resulting asphalt mix is lighter. However, in practice, the quantity of expanded clay, vermiculite or other rock or expanded glass that can be added is limited if one wishes the asphalt mix conserves good mechanical properties. Accordingly, the higher the quantity of expanded glass in the asphalt mix formulation, the weaker the asphalt mix will be. Consequently, the asphalt mix is not suitable for road application, still less highway application. The addition of porous clay or porous rock, such as vermiculite, to the formulation of the asphalt mix also requires increasing the binder quantity in the formulation. Indeed, since part of the binder is lost in the pores, it is necessary to increase the binder content to keep the same cohesion properties for the aggregate fraction in the asphalt mix.

Surprisingly, it has been discovered that it was possible to produce a lightweight asphalt mix, retaining good mechanical properties, in particular rutting resistance, water resistance and mass loss with the Cantabrian test, using light and non-absorbent aggregates.

The subject of the invention is asphalt mix comprising an aggregate fraction and a binder, he aggregate fraction comprising components with a size below 0.063 mm, components with a size comprised between 0.063 and 2 mm, and components with a size comprised between 2 mm and 31.5 mm, characterized in that in the aggregate fraction, all or part of the components are chosen from among light and nonabsorbent aggregates with a density below 1.6 $t/m^3$ and having a water absorption coefficient below 15%.

In asphalt mix, the aggregates are completely coated by binder.

Light aggregates have a density below 1.6 $t/m^3$ and therefore much less than the density of conventional aggregates, which are around 2.6 $t/m^3$. Light aggregates are also lighter than porous clay, which had been proposed in the prior art. Advantageously, light and nonabsorbent aggregates have a density comprised between 1.1 and 1.5 $t/m^3$.

In addition to being light, the aggregates are "nonabsorbent". The nonabsorbent property is characterized by measuring the water absorption coefficient. In the sense of the present invention, a nonabsorbent aggregate is an aggregate that has a water absorption coefficient below 15%, advantageously comprised between 3 and 15%, more advantageously comprised between 6 and 13%.

The "water absorption coefficient" is measured according to the standardized protocol described in standard NF EN 1097-6 (version of June 2001 supplemented by the version of February 2006).

The water absorption coefficient is the ratio of the mass increase of a sample of aggregates to its dry mass, after oven heating, due to penetration of water into the water-accessible pores.

The water absorption coefficient is calculated (in percentage of the dry mass) (WA24) according to the following equation:

$$WA24 = \frac{100 \times (M1 - M4)}{M4}$$

where:

M1 is the mass of saturated aggregates superficially dried in air, in grams:

M4 is the mass of the test sample dried in air in the oven, in grams;

Masses M1 and M4 are measured according to the following protocol. The aggregates are immersed in water (room temperature, i.e. 22±3° C.) for a sufficient time (advantageously 24 hours). The aggregates are then recovered, dried with a cloth, spread out in a single layer and left to dry in open air, but sheltered from sunlight or any other heat source, until the visible water films have disappeared. The aggregates are weighed (M1). Then the aggregates are transferred to a plate and put in an oven at a temperature of (110±5° C.) until a constant mass is reached (M4).

Depending on the particle size class, the water absorption coefficient is measured by the wire-basket method or the pycnometer method. For aggregates comprised between 31.5 mm and 63 mm, the wire basket method is used (the aggregates are loaded into the basket); for aggregates comprised between 4 mm and 31.5 mm or between 0.063 mm and 4 mm, the pycnometer method is used (the aggregates are loaded into a pycnometer filled with water).

The aggregates absorb significantly less water than expanded glass (water absorption coefficient 17.9%) or porous clay (water absorption coefficient of 17.6%)

These aggregates also have good mechanical resistance.

These aggregates advantageously have an empty space percentage greater than 50%, since the pores are mostly closed. Thus, advantageously more than 90% of the number of pores are closed pores, advantageously more than 95% and up to 100% of the pores are closed pores. These closed pores will also ensure that the binder is not absorbed by the aggregates. Thus, the asphalt mix properties will not change much from those of a conventional asphalt mix.

The percentage of empty space is advantageously greater than 60%, more advantageously comprised between 65% and 80%, still more advantageously comprised between 65% and 75%. The percentage in empty space can be determined by the geometric method such as the one described in standard NF EN 12697-6 or by a gamma densitometry method, such as the one described in standard NF EN 12697-7.

The particle size of these aggregates is compatible with a use for producing asphalt mixes. It therefore advantageously varies from 0.063 mm to 31.5 mm. It is more advantageously comprised between 0.063 mm and 20 mm. The aggregates can be crushed or uncrushed. Light aggregates of each particle size class are nonabsorbent and therefore have a water absorption coefficient less than 15%, such as previously defined.

These light and nonabsorbent aggregates are advantageously expanded slate, in particular Mayenne expanded slate. More advantageously, these aggregates are the aggregates sold by Granulats Expanses de la Mayenne under the tradename Granulex®. These Granulex® aggregates have the following physiochemical characteristics:

TABLE 1

| Mineral composition | Percentage (by weight) |
|---|---|
| SiO$_2$ | 63% |
| Al$_2$O$_3$ | 21% |
| Fe$_2$O$_3$ | 8.5% |
| K$_2$O | 3.6% |
| Na$_2$O | 1.5% |
| MgO + CaO | 1.5% |
| Other | Qs 100% |

These aggregates are used to manufacture asphalt mix. The asphalt mixes comprise a binder, which coats the aggregate fraction.

The binder is what allows the aggregates to stick together and ensures good mechanical strength to the roadway. A binder can be bituminous, plant-based or synthetic.

"Binder" means a hydrocarbon binder, advantageously of fossil origin, or any binder of plant-based or synthetic origin, usable for creating an asphalt mix. Advantageously, it is a pure bitumen, of any composition containing bitumen and possible one or more additives and/or one or emulsifiers and/or one or more viscosifiers and/or one or more fluxing agents and/or one or more plasticizers and/or any other additive to adjust the properties such as, for example, adhesion. Examples include bitumen and bitumen modified by elastomers and/or by plastomers.

This bituminous binder can be in the form of a liquid, emulsion or foam. In the case of cold-mix, the bituminous binder will advantageously be in the form of an emulsion or foam.

The binder can be of any grade. The binder can be a hard or soft binder.

In one advantageous variant of the invention, paving grade binders that meet standards NF EN 12591 (2009, pure bitumens) or EN 13924 (2006, hard bitumens) will be used.

In the asphalt mixes according to the invention, the binder content advantageously varies from 6 to 20% by weight, with regard to the total weight of the asphalt mix, more advantageously from 6 to 12% by weight.

According to the invention, in the aggregate fraction, all or part of the components can be replaced by the light and nonabsorbent aggregates described previously.

The size of the mineral aggregates is measured by the tests described in standard NF EN 933-2 (May 1996 version).

Advantageously, the aggregate fraction comprises:
components smaller than 0.063 mm (filler or fines)
sand whose components are comprised between 0.063 mm and 2 mm;
loose chippings, whose components have dimensions comprised between 2 mm and 6 mm;
greater than 6 mm;

"Mineral fines" or "filler" means any mineral or siliceous filler that can go through a square mesh sieve of 0.063 mm sides. The fines can be natural fines or added fines, for example limestone fines (calcium carbonate), cement or hydrated lime, or recovered.

The "aggregate fraction" is designated by the term "O/D mineral fraction" This 0/D mineral fraction can be separated into several particle sizes: the 0/d mineral fraction and the d/D mineral fraction. The finest components (the 0/d mineral fraction) will be those comprised in the range between 0 and a maximum diameter that can be set between 2 and 6 mm (from 0/2 to 0/6), advantageously between 2 and 4 mm. The other components (mineral diameter greater than 2, 3, 4, 5 or 6 mm; and approximately up to 31.5 mm) constitute the d/D mineral fraction.

Light and nonabsorbent aggregates can make up all or part of the aggregate fraction. They can make up all or part of the 0/d fraction and/or all or part of the d/D fraction.

Advantageously, the content in light and nonabsorbent aggregates varies from 50% to 100%, more advantageously from 60% to 100%, by weight, still more advantageously from 70% to 100% by weight, relative to the total weight of the aggregate fraction, the rest being made up of so-called "conventional" aggregates.

The so-called "conventional" aggregates are advantageously selected from the group comprising natural mineral aggregates (loose chippings, sand, fines) from quarries or gravel pit, recycling products such as mix aggregates resulting from recycling materials recovered during road repair operations and surplus from coating plants, manufacturing scrap, aggregates originating from the recycling of road materials including concrete, slag particularly dross, shale particularly bauxite or corundum, rubber powders resulting from the recycling of tyres, artificial aggregates of any origin e.g. from incineration of municipal solid waste incinerator bottom ash (MSWIBA), and mixtures thereof in all ratios.

The term "recycled aggregate" means asphalt mixes (mixture of aggregates and bituminous binders) originating from ground road surface slabs, crushed asphalt pavement slabs, pieces of coated slabs, asphalt mix waste or production surpluses (production surpluses are coated or partially coated materials in the factory resulting from temporary manufacturing steps). These components and other recycling products can be up to 31.5 mm in size.

In the aggregate fraction, the fine content (components less than 0.063 mm) varies advantageously from 5 to 25% by weight with regard to the total weight of the aggregate fraction.

In the aggregate fraction, the content of components of a size less than or equal to 2 mm can vary from 20 to 100% by weight with regard to the total weight of the aggregate fraction.

In the aggregate fraction, the content of components of a size comprised between 10 mm and 31.5 mm advantageously varies from 20 to 100% by weight with regard to the total weight of the aggregate fraction.

Asphalt mixes according to the invention can also comprise one or more additives. The additives can be added to either the binder, the aggregates or the asphalt mix.

These additives are used for mechanical purposes, and may generally be a polymer, such as polyethylene, polypropylene, ethylene copolymers (such as EVA (ethylene vinyl acetate copolymer) or EBA (ethylene butyl acrylate copolymer), SBS (poly(styrene-butadiene-styrene)) or SB (poly(styrene-butadiene)) crosslinked or not.

For adhesion purposes, adhesivity doping agents are used, for example emulsifiers derived from polyamines.

For purposes of lowering manufacturing and use temperatures, the additives used are, for example, natural oils, chemically treated or not, zeolites or paraffin.

Additives could also be used for aesthetic purposes, notably for changing the colour of the final road products, by the use of pigment, natural or not, such as iron oxide.

The asphalt mixes according to the invention, obtained by using these light and nonabsorbent aggregates, have a density less than 2.0 t/m$^3$. Advantageously, they have a density comprised between 1.5 t/m$^3$ and 2.0 t/m$^3$. These asphalt mixes are generally much lighter than conventional asphalt mix, which has a density generally ranging between 2.4 t/m$^3$ and 2.8 t/m$^3$.

The asphalt mixes according to the invention have very good mechanical properties. In particular, the asphalt mixes according to the invention are identical to conventional asphalt mixes in terms of performance and are distinguished by their lower surface weight.

In particular, asphalt mixes according to the invention are resistant to rutting. For bituminous mix, the percentage of rutting after 30,000 cycles is advantageously less than 7.5%, more advantageously less than 5%, still more advantageously less than 3%. For very thin asphalt concretes, or other "open" asphalt mixes for surface or intermediate course, the percentage of rutting after 3000 cycles is advantageously less than 10%, more advantageously less than 8%, still more advantageously less than 7.5%.

Rutting resistance shows resistance of the coating layer to deformation, in particular under high stress. The coating layer deposited will then be resistant to traffic, including heavyweight traffic.

The rutting percentage is measured according to the protocol described in standard NF EN 12697-22 (September 2007).

Furthermore, the asphalt mixes according to the invention are resistant to mass loss, with Cantabrian values at 20° C. preferably less than 20, more preferably less than 10, even more preferably less than 7.

The Cantabrian value is measured according to the protocol described in standard NF EN 12697-17 (September 2007).

Furthermore, asphalt mixes according to the invention are water resistant, with minimum indirect tensile strength ratio ITSR advantageously greater than 70%, more advantageously greater than 80%.

The ITSR percentage is measured according to the protocol described in standard NF EN 12697-12 (September 2008).

These asphalt mixes can be used hot (130° C. to 180° C.), warm (110° C. to 130° C.), semi-warm (80° C. to 110° C.), or even cold (T<80° C.).

In the case of the method known as "hot mix", the aggregates are heated in devices called "dryers" providing good adhesion of the bitumen to the aggregate. The binder, like the bitumen, is also heated, to temperatures around 160° C. in order to lower the viscosity and allow good coating of the aggregates. The mix thus formed is then applied hot (typically at higher than 140° C.) onto the roadway and then also hot compacted, the initially high temperature guarantees its workability. The material then rigidifies as it cools.

In methods known as "cold mix", the aggregates are not dried, and are mixed as such, i.e., with their natural moisture content (plus an adjustment of water content if necessary) and at ambient temperature. The binder is then added in various forms, the most common being that of a bitumen emulsion that allows having a less viscous product and therefore workable at ambient temperature. The emulsion is sometimes lightly reheated at temperatures of around 50° C. Another resource, whose use is not fully developed but is increasing, consists of foaming hot bitumen (typically at 160° C.) on contact with a little water injected directly into the bitumen according to suitable methods, to then mix this foam into the wet aggregate. Additives can be added to the bitumen and/or the water injected to modify the foam properties, especially its stability and volume.

Methods known as "warm" or "semi-warm", and, and whose name is sometimes different than the one proposed here (semi-hot, etc.) but which those skilled in the art know how recognize unequivocally, consist of either slightly heating the aggregate, but not enough to dry it completely, or drying it at temperatures just above 100° C. Several methods exist, for example, the binder can be added in the same forms as for cold mixes (bitumen emulsion or foam). Also, especially when the goal is to reduce the manufacturing temperature and the use of hot mixes, to limit emissions of smoke, this may require the use of additives or original methods in order to ensure that the mix maintains a level of workability compatible with its implementation at temperatures below those commonly used.

The invention also has for a subject the use of light and nonabsorbent aggregates of density below 1.6 t/m$^3$ and with a water absorption coefficient comprised below 15% for manufacture of light asphalt mix.

Light and nonabsorbent aggregates are defined as previously.

The invention also has for a subject a road pavement obtained by application of at least one layer of asphalt mixes according to the invention. Advantageously, this layer has a thickness greater than or equal to 2 cm. A road pavement advantageously comprises, going from the ground outward, a base course, an intermediate course, also called bonding course and a surface course.

The base course is also a main structural element of a roadway. The base may be laid in one or more courses, commonly called "base courses" or "roadbase courses".

A course is a structural element of a roadway composed of a single material. A course can be spread in one or more elementary layers. An elementary layer is a component of the roadway laid in a single operation.

The pavement according to the invention is, in particular, a surface course, an intermediate course and a base course. More advantageously, the pavement is an intermediate course.

The roadway can be a road, and more particularly a highway.

As has already been explained, these asphalt mixes can be used hot (130° C. to 180° C.), warm (110° C. to 130° C.), semi-warm (80° C. to 110° C.), or even cold (T<80° C.).

The invention finally concerns a method to apply a roadway pavement onto an above-ground surface comprising an asphalt mix application step such as defined according to the invention. As has already been explained, these asphalt mixes can be used hot (130° C. to 180° C.), warm (110° C. to 130° C.), semi-warm (80° C. to 110° C.), or even cold (T<80° C.). Advantageously, the asphalt mixes according to the invention are applied as the intermediate course.

It is very interesting to note that a layer of 20 cm of asphalt mixes according to the invention could have the same density as a layer of 14 cm of conventional asphalt mixes. This will notably permit applying the same thickness of asphalt mixes layer when applying a road pavement, whether it is on the ground or above the ground, for example, an engineering structure, with generation of a lesser load.

The above-ground surface is advantageously an engineering structure, a terrace or a suspended parking lot.

EXAMPLES

Example 1

Characteristics of Light and Nonabsorbent Aggregates According to the Invention

The characteristics of absorption coefficient and density for light aggregates according to the invention are compared in the following table to the characteristics of expanded clay and expanded glass.

TABLE 2

|  | light aggregates according to the invention | | Expanded clay | Expanded glass |
| --- | --- | --- | --- | --- |
|  | uncrushed | crushed | | |
| Water absorption coefficient (%) NF EN 1097-6 | 7.7 | 11.0 | 17.6 | 17.9 |
| Absolute density (t/m3) NF EN 1097-6 | 1.262 | 1.308 | 1.169 | 0.420 |

Note that the light aggregates have a density comparable to that of expanded clay. In contrast, aggregates according to the invention have a significantly lower absorption coefficient than that of expanded clay or glass.

Example 2

Light Asphalt Mixes According to the Invention

An example of formulation of the lightweight asphalt mix according to the invention, for an intermediate course with a 0/14 aggregate fraction and a grade 35/50 bitumen, is given in the table below:

TABLE 3

| Materials | % by weight |
| --- | --- |
| 10/14 Light aggregate (%) | 31.8 |
| 4/10 Light aggregate (%) | 9.1 |
| 0/2 Light aggregate (%) | 27.3 |
| 0/2 Diorite (%) | 18.2 |
| Filler (%) | 4.5 |
| bitumen 35/50 (%) | 9.1 |

The mechanical properties of the asphalt mixes obtained by a hot method from this formulation are given in the table below:

TABLE 4

| True density | |
| --- | --- |
| NF EN 1267-5 (g/cm3) PCG (NF EN 12697-31) | 1.697 |
| Gyration number empty (%) ITSR (NF EN 12697-12 A) | 100 10.9 |
| ITS air (kPa) ITS water (kPa) ITSR % Rutting (NF EN 12697-22) | 859 840 97.8 |
| number of cycles rutting (%) Module (NF EN 12697-26) | 30000 1.9 |
| E* 15° C. 10 Hz (Mpa) Cantabrian mass loss at 20° C. % (NF EN 12697-17) | 7059 5.6 |

The mechanical properties of these asphalt mixes are compared with prepared hot asphalt mixes from the same formulation but in which the light aggregates are replaced either by vermiculite or by expanded glass. The results are given in the table below:

TABLE 5

| TEST | F1 0/14 lightweight asphalt mix based on vermiculite | F2 0/14 lightweight asphalt mix based on expanded glass | F3 0/14 lightweight asphalt mix according to the invention |
| --- | --- | --- | --- |
| NF EN 12697-22 Rutting | | | |
| Rutting at 30,000 cycles (%) | 6.90% | >15% | 1.90% |
| True density of the mix according to NF EN 12697-5 t/m3 | 1.752 | 1.79 | 1.697 |

Therefore it is noted that the asphalt mixes according to the invention are light but, at the same time, have mechanical properties, in particular rutting resistance, that could not be obtained with porous rock or expanded glass.

Another example of formulation of the lightweight asphalt mix according to the invention, for a binding layer with a 0/10 aggregate fraction and a grade 20/30 bitumen, is given in the table below:

TABLE 6

| Materials | % by weight |
|---|---|
| 4/10 Light aggregate (%) | 31.4 |
| 0/4 light aggregate (%) | 35.9 |
| 0/2 Diorite (%) | 18.2 |
| Filler (%) | 4.5 |
| bitumen 20/30 (%) | 10.0 |

The mechanical properties of the asphalt mixes obtained by a hot-mix method from this formulation are given in the table below:

TABLE 7

| True density | |
|---|---|
| NF EN 1267-5 (g/cm3) | 1.697 |
| PCG (NF EN 12697-31) | |
| Gyration number | 60 |
| empty (%) | 9.7 |
| ITSR (NF EN 12697-12 A) | |
| ITS air (kPa) | 1100 |
| ITS water (kPa) | 1054 |
| ITSR % | 95.8 |
| Rutting (NF EN 12697-22) | |
| number of cycles | 30000 |
| rutting (%) | 4.2 |
| Module (NF EN 12697-26) E* 15° C. 10 Hz (Mpa) | 9200 |

The mechanical properties of the lightweight asphalt mix are as good as those of a conventional asphalt mix while the density of the asphalt mix is significantly lightened.

Another example of formulation of the lightweight asphalt mix according to the invention, for a surface course with a 0/10 aggregate fraction and a grade 35/50 bitumen, is given in the table below:

TABLE 8

| Materials | % by weight |
|---|---|
| 4/10 Light aggregate (%) | 49.1 |
| 0/4 Light aggregate (%) | 21.8 |
| 0/2 Diorite (%) | 18.2 |
| Filler (%) | 1.8 |
| bitumen 35/50 (%) | 9.1 |

The mechanical properties of very thin asphalt concrete (VTAC) obtained from this formulation are given in the following table:

TABLE 9

| True density | |
|---|---|
| NF EN 1267-5 (g/cm3) | 1.606 |
| PCG (NF EN 12697-31) | |
| Gyration number | 25 |
| empty (%) | 22.5 |
| ITSR (NF EN 12697-12 A) | |
| ITS air (kPa) | 752 |
| ITS water (kPa) | 684 |
| ITSR % | 91 |

TABLE 9-continued

| Rutting (NF EN 12697-22) | |
|---|---|
| number of cycles | 3000 |
| rutting (%) | 7 |

The mechanical properties of the lightweight VTAC are as good as those of a conventional VTAC while the density of the VTAC is significantly lightened.

The invention claimed is:

1. Asphalt mix comprising an aggregate fraction and a binder, the aggregate fraction comprising
    components with a size below 0.063 mm
    components with a size comprised between 0.063 and 2 mm, and
    components with a size comprised between 2 mm and 31.5 mm,
    characterized in that in the aggregate fraction, all or part of the components are light and nonabsorbent aggregates with a density between 1.1 and 1.6 t/m$^3$ and having a water absorption coefficient below 15%.

2. Asphalt mix according to claim 1, wherein the light and nonabsorbent aggregates have a density comprised between 1.1 and 1.5 t/m$^3$.

3. Asphalt mix according to claim 1, wherein the light and nonabsorbent aggregates have a water absorption coefficient comprised between 6 and 15%.

4. Asphalt mix according to claim 1, wherein the light and nonabsorbent aggregates are expanded slate.

5. Asphalt mix according to claim 4, wherein the light and nonabsorbent aggregates are Mayenne expanded slate.

6. Asphalt mix according to claim 1, wherein the binder content varies from 6 to 20% by weight, with regard to the total weight of the asphalt mix.

7. Asphalt mix according to claim 1, wherein the binder is a hydrocarbon binder or a plant-based binder or a synthetic binder.

8. Asphalt mix according to claim 7, wherein the binder is a hydrocarbon binder.

9. Asphalt mix according to claim 1, wherein the light and nonabsorbent aggregates have a content which varies from 60 to 100% by weight, with regard to the total weight of the aggregate fraction.

10. Asphalt mix according to claim 1, wherein said asphalt mix has a density less than 2 t/m$^3$.

11. Asphalt mix according to claim 1, wherein said asphalt mix is resistant to rutting.

12. Asphalt mix according to claim 11, wherein said asphalt mix has a percentage of rutting after 30,000 cycles less than 7.5%.

13. Asphalt mix according to claim 1, wherein said asphalt mix is resistant to mass loss, with Cantabrian values less than 20.

14. Asphalt mix according to claim 13, wherein said asphalt mix has Cantabrian values less than 10.

15. Asphalt mix according to claim 1, wherein said asphalt mix is water resistant, with a ITSR percentage greater than 70%.

16. Asphalt mix according to claim 15, wherein said asphalt mix has a ITSR percentage greater than 80%.

17. Roadway pavement obtained by application of at least one layer of asphalt mix according to claim 1.

18. Roadway pavement according to claim 17, wherein the pavement is a surface course, an intermediate course and a base course.

19. Method for applying a surface course onto an above ground surface comprising a step of applying asphalt as defined in claim 1.

20. Method of manufacturing light asphalt mix comprising mixing a binder with light and nonabsorbent aggregates of density between 1.1 and 1.6 t/m$^3$ and with a water absorption coefficient below 15%.

* * * * *